United States Patent [19]

Aubert et al.

[11] Patent Number: 4,504,553
[45] Date of Patent: Mar. 12, 1985

[54] COVERING FOR PHOTOTHERMAL CONVERSION

[75] Inventors: André Aubert, Grenoble; Jean Valignat, Eybens; Christophe Wyon, Saint Martin d'Heres, all of France

[73] Assignee: Commissariat a l'Energie Atomique, Paris, France

[21] Appl. No.: 480,483

[22] Filed: Mar. 30, 1983

[30] Foreign Application Priority Data

Mar. 31, 1982 [FR] France ............................. 82 05531

[51] Int. Cl.³ ............................................. C25D 11/34
[52] U.S. Cl. .................................... 428/622; 428/630; 428/631; 428/634; 428/672; 428/673; 428/677; 428/685; 428/674; 126/901
[58] Field of Search ............... 428/622, 630, 631, 634, 428/672, 673, 677, 685; 126/901

[56] References Cited

U.S. PATENT DOCUMENTS

| 3,198,674 | 8/1965 | Huppke | 148/6.27 |
| 4,022,947 | 5/1977 | Grubb et al. | 428/469 |
| 4,098,956 | 7/1978 | Blickensderter et al. | 428/627 |
| 4,334,523 | 6/1982 | Spandoudis | 126/443 |

FOREIGN PATENT DOCUMENTS

| 2604019 | 8/1977 | Fed. Rep. of Germany | 126/901 |
| 2709837 | 9/1977 | Fed. Rep. of Germany | 126/901 |
| 3031346 | 3/1982 | Fed. Rep. of Germany | 126/901 |
| 2340516 | 9/1977 | France . | |
| 2354393 | 1/1978 | France . | |
| 2354521 | 1/1978 | France . | |
| 2364273 | 4/1978 | France . | |
| WO82/00510 | 2/1982 | PCT Int'l Appl. . | |

OTHER PUBLICATIONS

Long, R. L.; "A Review of Recent Air Force Research on Selective Solar Absorbers", *Journal of Engineering for Power*, pp. 277-280, (7/65).
Thornton, J. A. et al.; "Sputtered Austenitic Manganese Steel", *Thin Solid Films*, p. 397, vol. 45, (1977).

*Primary Examiner*—Veronica O'Keefe
*Attorney, Agent, or Firm*—Michael N. Meller

[57] ABSTRACT

An infrared radiation reflecting substrate, having deposited thereon a first layer formed from a metal or an alloy, and a second layer deposited on the first layer and consisting of a solar radiation absorbing amorphous material, such as amorphous carbon. The substrate can be formed from an infrared radiation reflecting layer deposited on a primary substrate.

11 Claims, 1 Drawing Figure

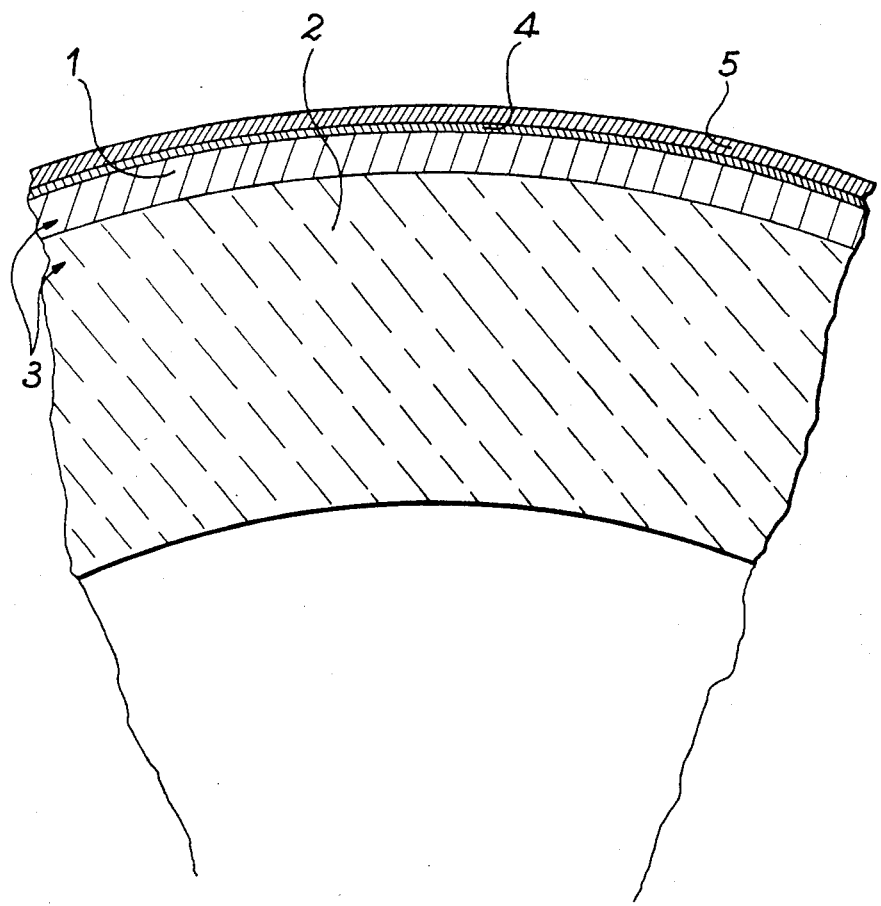

COVERING FOR PHOTOTHERMAL CONVERSION

BACKGROUND OF THE INVENTION

The present invention relates to a covering for photothermal conversion and more particularly applies to the photothermal conversion of solar energy.

It is known that so-called "selective" surfaces are being increasingly used for the photothermal conversion of solar energy, because they make it possible to significantly improve conversion efficiencies. These surfaces are such that they heat by absorbing incident solar radiation in the same way as a black body, but unlike the latter, they only emit very little infrared radiation, so that their heat losses are minimized. Among the different known methods for producing them, that which is most frequently used at present consists of depositing a thin layer of a material absorbing solar radiation on an only slightly emissive layer, i.e. which reflects infrared radiation.

At present there are two main groups of methods used for depositing the thin layer of absorbent materials, namely liquid phase deposition methods (chemical and electrolytic deposits, deposits by immersion, etc.), and vapor phase deposition methods (vacuum evaporation, cathodic sputtering, etc).

The methods of the second group are more difficult to carry out than those of the first group, but nevertheless offer the possibilities of producing composite materials, which would be difficult or even impossible to obtain by using liquid phase deposition methods.

However, the methods of the first and second groups have one point in common, namely with said methods, an attempt is generally made to produce a thin absorbent layer of the "cermet" type, which is a very fine dispersion of a phase having a metallic nature in a matrix having a dielectric nature and in order to increase still further the absorbing properties of the cermet, its composition is made variable in its thickness. Thus, attempts are made to obtain a cermet having a metallic nature at the interface with the infrared radiation reflecting layer and with a dielectric nature at the interface with the ambient medium (air) to obtain a so-called "graded" cermet.

The optical properties of the numerous cermets are now well known and have been widely publicized in the literature. For example, reference can be made to cermets obtained by the reactive cathodic sputtering of a stainless steel target in a residual atmosphere of argon and acetylene. Cermets of this type are, for example, envisaged in U.S. Pat. No. 4,309,261 and in a communication entitled "In line production system for sputter deposition of graded index solar absorbing films", by D. R. McKenzie et al., 8th International Vacuum Congress, Cannes, September 1980.

Apart from the fact that reactive cathodic sputtering is much more difficult to control than non-reactive cathodic sputtering due, inter alia, to the pressure gradient of the reactive gas which has to be maintained in the sputtering chamber, the layers of the type referred to in the aforementioned paragraph and obtained by reactive cathodic sputtering, contain a large proportion of hydrogen, as has been stated in the article entitled "Properties of hydrogenated carbon films produced by reactive magnetron sputtering", by D. R. McKenzie et al., published in Solar Energy Materials, 6, 1981, pp. 97-106.

The presence of hydrogen in the deposited layer is prejudicial to the production of a vacuum transducer for photothermal conversion, because it makes the degassing operations which have to be carried out during its production more difficult. Moreover, the desorption of this hydrogen during heat treatment seems to be one of the most important reasons for the deterioration in the optical properties of graded cermets produced from stainless steel and carbon.

Coverings for photothermal conversion are also known, which are obtained by a method consisting of depositing a graphite layer on an infrared radiation reflecting layer,, the latter being itself deposited on a substrate and which can be of copper, silver, nickel or titanium. This method is described in the article entitled "Effect of substrate on graphite and other solar selective surfaces", by D. R. McKenzie, published in Applied Optics, vol. 17, no. 12, 1978, pp. 1984 to 1988. It is much simpler than the reactive cathodic sputtering method and can therefore be much more easily controlled, because it only involves the superimposing of two elementary homogeneous layers. Moreover, these layers are free from prejudicial foreign atoms, such as hydrogen atoms, due to the procedure used for depositing the graphite layer, namely vacuum evaporation by an electron gun.

Unfortunately, the graphite layers obtained by this method are not sufficiently absorbent to be suitable for industrial applications. Thus, their solar absorption factor is only 0.70 for graphite deposited on copper and 0.80 for graphite deposited on titanium.

SUMMARY OF THE INVENTION

The present invention relates to a covering for photothermal conversion, which does not suffer from the disadvantages of the known coverings described hereinbefore. Thus, it can be produced in a simple manner and has thermally stable layers, which are free from hydrogen and whose solar absorption factor can be equal to or higher than 0.90.

More specifically, the present invention relates to a covering for photothermal conversion, wherein it comprises an infrared radiation reflecting substrate, a first layer deposited on this substrate and constituted by at least one metallic compound, and a second layer deposited on the first layer, said second layer being constituted by an amorphous material and being able to absorb solar radiation.

According to another feature of the covering according to the invention, the substrate is formed by an infrared radiation reflecting layer and a primary substrate, the infrared radiation reflecting layer being deposited on the primary substrate.

In other words, the first and second layers can be deposited on a solid infrared radiation reflecting substrate, or on an infrared radiation reflecting layer, previously deposited on the socalled primary substrate.

It is only as a result of the use of a metallic layer, between the infrared radiation reflecting substrate and the absorbent layer (second layer), and the use of such a non-crystalline, amorphous, absorbent layer (unlike graphite, which has a crystalline structure), that it is possible to obtain a covering having a high reflection factor, whilst still retaining a very low emission factor in the infrared. The infrared radiation reflecting substrate can, for example, consist of copper, silver or gold.

According to another special feature of the covering according to the invention, the first layer is produced from at least one of the materials taken in the group including transition metals and their alloys. The first layer is, for example, obtained from a stainless steel, due to its ease of production and low cost.

According to yet another feature, the thickness of the first layer is approximately a few dozen nanometers, e.g. approximately 10 to 50 nm.

According to another feature, the second layer is an amorphous carbon layer.

According to a preferred feature, the thickness of the second layer is equal to or greater than that of the first layer, e.g. has a thickness of approximately 50 to 150 nm.

According to yet another feature, the first and second layers are deposited by cathodic sputtering.

Finally, according to yet another feature, when the substrate is constituted by the infrared radiation reflecting layer on the primary substrate, the infrared radiation reflecting layer and the first and second layers are deposited by cathodic sputtering.

DESCRIPTION OF THE DRAWING AND PREFERRED EMBODIMENTS

Other features and advantages of the covering for photothermal conversion according to the invention will become more apparent from the following description relative to a non-limitative embodiment and with reference to the attached drawing, which diagrammatically shows part of a covering according to the invention.

In this embodiment, the covering according to the invention comprises an infrared radiation reflecting layer 1, deposited on a primary substrate 2, so as to form an infrared radiation reflecting substrate 3 and a first layer 4, together with a second layer 5, successively deposited on the infrared radiation reflecting layer.

The different layers are successively deposited on the primary substrate by cathodic sputtering in an inert gas, such as argon. Thus, onto the primary substrate, formed for example from a borosilicate glass (marketed under the trademark PYREX), there is deposited the infrared radiation reflecting layer, which is a thin layer made e.g. from copper, in preference to silver or gold, which are expensive metals. This is followed by the successive deposition of a first metallic layer, then a second amorphous layer, which are very thin and homogeneous and serve to form a very selective covering, combined with the copper layer.

The first layer is obtained by the deposition of a very thin metallic film having a thickness between 10 and 50 nm. To achieve this, the material used is, for example, stainless steel, due to the fact that it is simple to produce and inexpensive.

The second layer is then obtained by the cathodic sputtering of a carbon target in a residual argon atmosphere. The second amorphous carbon layer preferably has a thickness which is at least equal to that of the first layer. For example, the thickness of the second layer is between 50 and 150 nm.

Apart from a high thermal stability, the covering obtained has very interesting optical properties for the photothermal conversion of solar energy. Thus, it is possible to obtain, by operating in the manner described hereinbefore, coverings having an absorption factor equal to or higher than 0.90, but whose emission factor remains equal to or below 0.05.

As an illustrative and non-limitative example, the following experimental conditions can be used for producing with the aid of a cathodic sputtering installation for producing deposits on cylindrical substrates, whereby said known installation is called a cylindrical magnetron, a covering according to the invention on a 28 mm diameter PYREX tube used as the primary substrate.

Notations:
(1) Type of cathode
(2) Argon pressure
(3) Cathode current density
(4) Sputtering voltage
(5) Sputtering time
(6) Deposite thickness

|     | Deposition of the infrared radiation reflecting layer: |
| --- | --- |
| (1) | Of copper |
| (2) | Between $6.10^{-3}$ and $2.10^{-2}$ Torr, optimum $10^{-2}$ Torr |
| (3) | Between 5 and 8 mA/cm$^2$ optimum 6.0 mA/cm$^2$ |
| (4) | optimum 500 V |
| (5) | Between 45 and 65 s optimum 55 s |
| (6) | Between 350 and 550 nm optimum 450 nm |
|     | Deposition of the first layer: |
| (1) | Of stainless steel |
| (2) | Between $6.10^{-3}$ and $2.10^{-2}$ Torr, optimum $10^{-2}$ Torr |
| (3) | Between 5 and 20 mA/cm$^2$ optimum 10 mA/cm$^2$ |
| (4) | optimum 580 V |
| (5) | Between 2.5 and 12 s optimum 5.5 s |
| (6) | Between 10 and 50 nm optimum 22.5 nm |
|     | Deposition of the second layer; produced from carbon: |
| (1) | Of carbon |
| (2) | Between $6.10^{-3}$ and $2.10^{-2}$ Torr, optimum $10^{-2}$ Torr |
| (3) | Between 5 and 8 mA/cm$^2$ optimum 6 mA/cm$^2$ |
| (4) | optimum 650 V |
| (5) | Between 55 and 165 s optimum 90 s |
| (6) | Between 50 and 150 nm optimum 80 nm |

Under the aforementioned conditions and using a method which is very simple for the expert to perform, it is possible to obtain a covering with a solar absorption factor of 0.91 and an emission factor of 0.04.

Under the same experimental conditions as hereinbefore, it is possible to produce the covering by directly placing the stainless steel layer and the amorphous carbon layer on a polished infrared radiation reflecting tube, made e.g. from copper, without using the primary PYREX substrate.

Obviously, the invention does not only relate to coverings for photothermal conversion, deposited on tubular or cylindrical substrates. It also relates to coverings, produced by cathodic sputtering, on substrates having different shapes and forms, by using adapted, known electrodes. For example, in the case of a planar substrate, the latter is held by a substrate holder and a cathode is arranged in parallel and facing the substrate.

Finally, the invention is not limited to the coverings obtained by cathodic sputtering. For the deposition of the absorbent layer, e.g. of amorphous carbon, it is possible to use all known methods, such as evaporation or chemical deposition in the vapor phase in the presence of a plasma.

What is claimed is:

1. A covering for photothermal coversion, comprising an infrared radiation reflecting substrate, a first layer deposited on said substrate and consisting of at least one metal or alloy of said metal, and a second layer deposited on the first layer, said second layer consisting of an amorphous material capable of absorbing solar radiation.

2. The covering according to claim 1, wherein the substrate comprises an infrared radiation reflecting layer and a primary substrate, the infrared radiation reflecting layer being deposited on the primary substrate.

3. The covering according to claim 1, wherein the infrared radiation reflecting layer is a metal selected from the group consisting of copper, silver and gold.

4. The covering according to claim 1, wherein the first layer is made of at least one of the materials selected from the group consisting of transition metals and their alloys.

5. The covering according to claim 4, wherein the first layer is made of stainless steel.

6. The covering according to claim 1, wherein the thickness of the first layer is approximately 10 to 50 nm.

7. The covering according to claim 1, wherein the second layer is an amorphous carbon layer.

8. The covering according to claim 1, wherein the thickness of the second layer is equal to or greater than that of the first layer.

9. The covering according to claim 8, wherein the thickness of the second layer is approximately 50 to 150 nm.

10. The covering according to claim 1, wherein the first and second layers are deposited by cathodic sputtering.

11. The covering according to claim 2, wherein the infrared radiation reflecting layer and the first and second layers are deposited by cathodic sputtering.

* * * * *